Feb. 1, 1966 W. H. TODTER 3,232,121
GYROSCOPE
Filed June 13, 1962 3 Sheets-Sheet 1
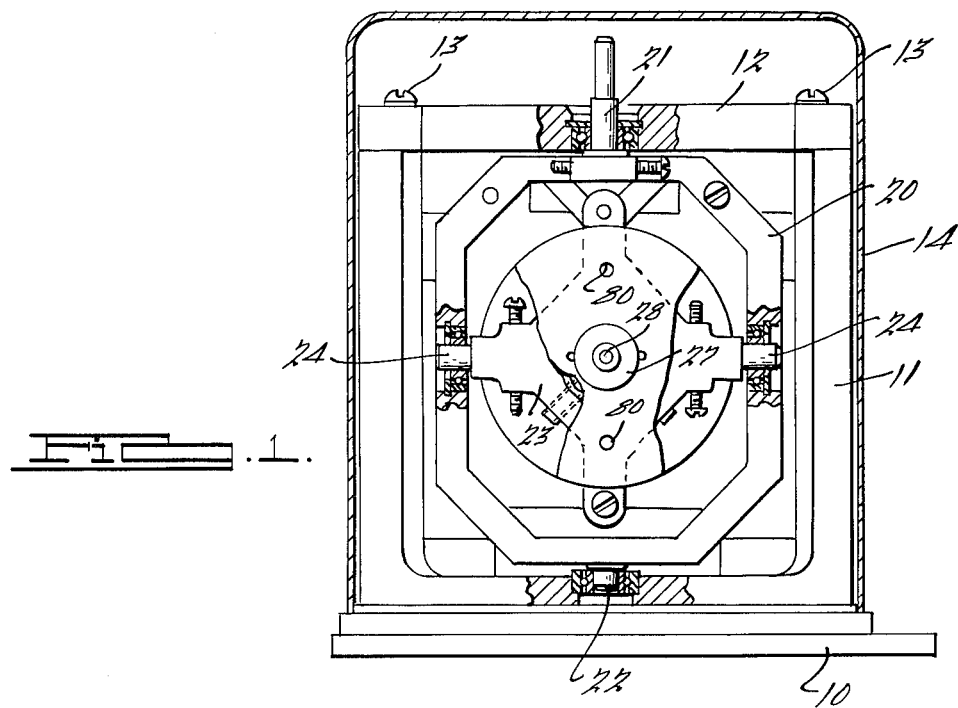
FIG. 1.
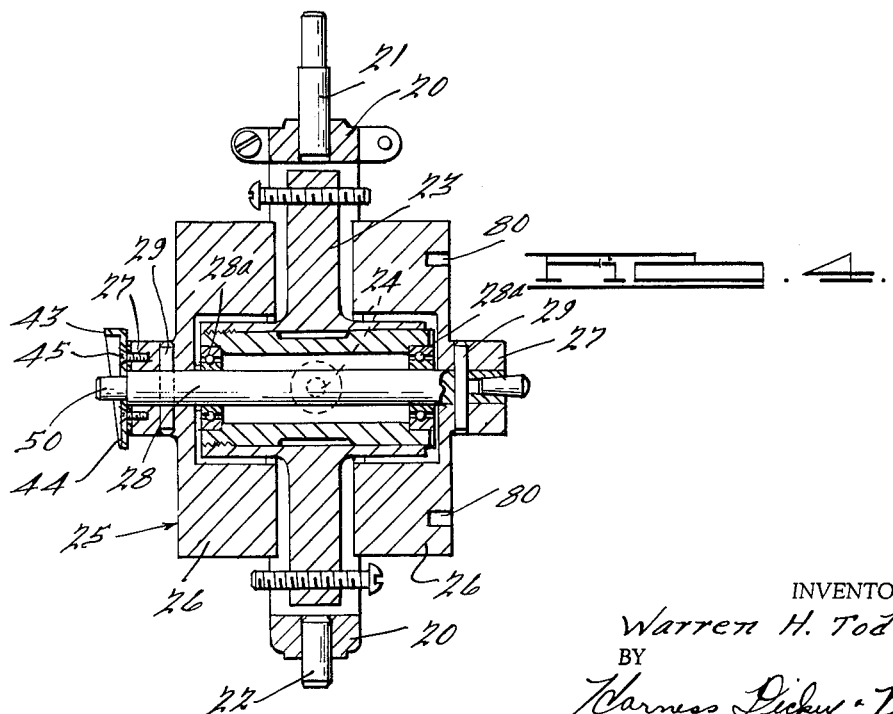
INVENTOR.
Warren H. Todter
BY
Harness, Dickey & Pierce
ATTORNEYS.

Feb. 1, 1966 W. H. TODTER 3,232,121
GYROSCOPE
Filed June 13, 1962 3 Sheets-Sheet 2

INVENTOR.
Warren H. Todter
BY
Harness, Dickey & Pierce
ATTORNEYS

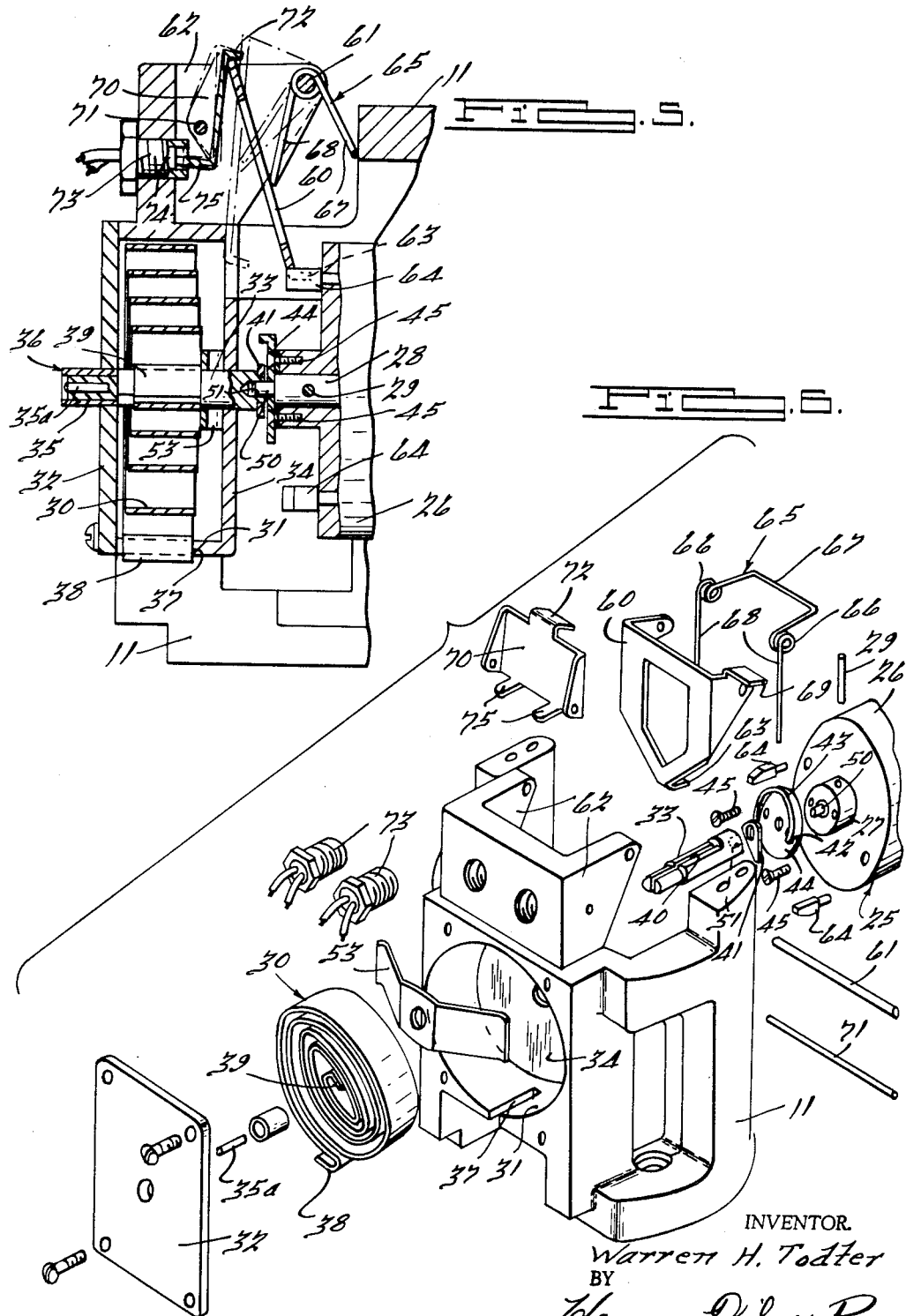

United States Patent Office 3,232,121
Patented Feb. 1, 1966

3,232,121
GYROSCOPE
Warren H. Todter, Boyne City, Mich., assignor to Model Engineering & Mfg. Corp., Boyne City, Mich., a corporation of Indiana
Filed June 13, 1962, Ser. No. 202,312
9 Claims. (Cl. 74—5.12)

This invention relates to gyroscopes and more particularly to a spring-energized gyroscope for use, for example, as an element of a guidance system for missiles and the like.

One of the objects of this invention is to provide a spring drive mechanism for mechanically accelerating the gyro rotor up to its operating speed and then automatically disengaging the spring drive mechanism from the rotor.

In accordance with this invention the spring drive mechanism comprises a coil spring having a centrally located drive shaft adapted to be detachably coupled to the shaft of the gyro rotor by moving or displacing the center of the spring laterally to an out-of-plane position. When the rotor achieves its operational speed so that the spring is no longer exerting its driving force, the spring returns to its in-plane position and uncouples its drive shaft from the rotor shaft. During the acceleration of the rotor, it is held in caged position, with a fixed orientation with respect to the frame, by providing a reduced end portion on one of the shafts which slidably engages within a socket on the other shaft. When the spring returns to its in-plane position, the driving means is uncoupled and the caging means is disconnected, whereupon the spinning rotor is then freely supported on the gyro gimbal system.

This invention also contemplates the provision of simple but effective means for holding the rotor in armed condition and for triggering the drive mechanism. This means comprises a spring-biased latch member cooperating with stops on the rotor to prevent rotation of the rotor until released; a latch hook for holding the latch member in operative position; and preferably electrically controlled means for releasing the latch hook to trigger the drive mechanism.

One of the objects of this invention is to provide an improved gyroscope assembly with a minimum of parts and complexity and with a high degree of simplicity in the overall assembly, and this object is attained by the construction described in the two preceding paragraphs.

Various other objects and advantages and the novel details of construction of one commercially practical embodiment of the invention will become more apparent as this description proceeds, especially when considered in connection with the accompanying drawings, in which:

FIGURE 1 is a sectional elevational view of a gyroscope device constructed in accordance with this invention;

FIGURE 4 is a detail sectional view showing parts of the gimbal system;

FIGURE 5 is a fragmentary sectional view taken substantially on the plane indicated by line 5—5 in FIGURE 3; and FIGURE 6 is an exploded perspective view showing the parts of the device forming the particular subject matter of this invention.

Figure 2:
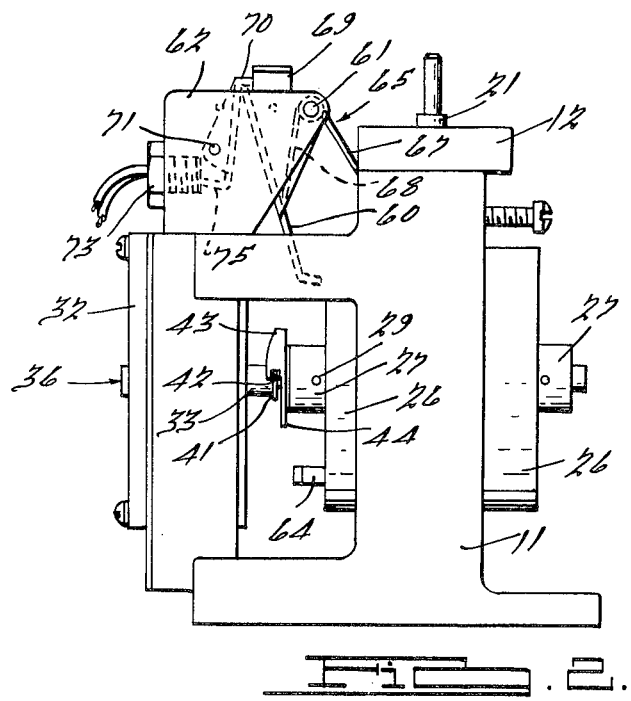
FIGURE 2 is a side elevational view of the unit shown in FIGURE 1 with the cover and base removed.
Figure 3:
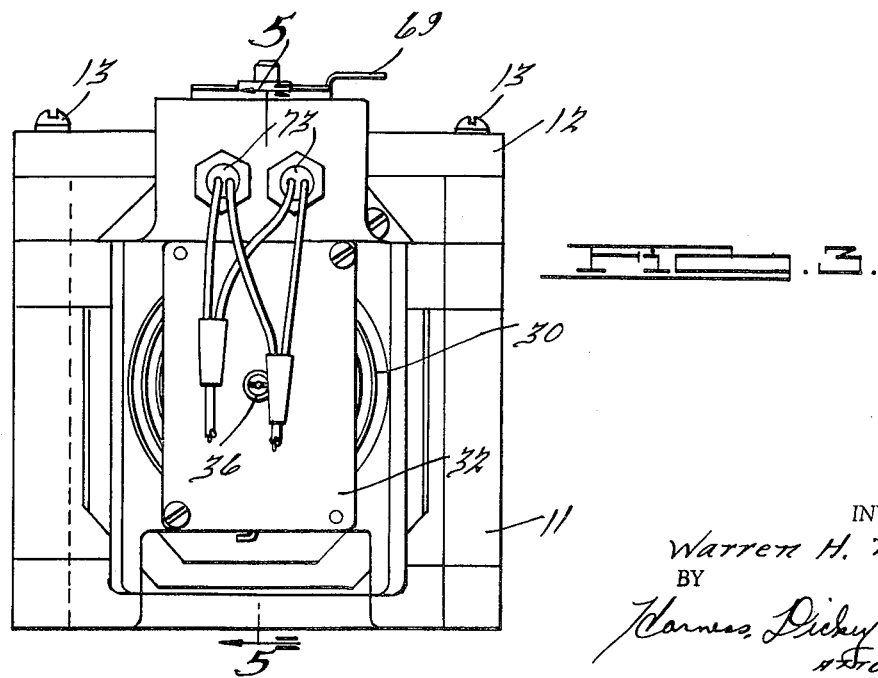
FIGURE 3 is an end elevational view as seen from the left in FIGURE 2.

In describing the invention, only the mechanical features of the gyroscope will be shown and described, all of the electrical control means having been omitted.

In the drawings, the reference character 10 indicates a base plate upon which is mounted the frame or body 11 of the device. The reference character 12 indicates a cap plate secured to the body or frame 11 by means of fastening elements 13. Usually, the entire gyroscope is closed and sealed within a housing 14 secured to the base 10.

The gimbal system consists of an outer gimbal 20 provided with trunnions 21 and 22 journaled respectively in the cap plate 12 and the bottom of the frame or body 11. The inner gimbal 23 is supported on the outer gimbal 20 by trunnions 24 (see FIGURE 1) and rotates about an axis at right angles to the axis of rotation of the outer gimbal 20. The rotor 25 includes two rotor halves 26, each of which is provided with a hub 27 fixed to a rotor shaft 28, as, for instance, by means of pins 29. The rotor shaft 28 is supported by bearings 28a in the gimbal 23 for rotation on an axis at right angles to the axis of rotation of the gimbal 23 on its trunnions 24.

The gyroscope structure thus far described is substantially conventional, and forms no part of the present invention.

The drive mechanism for accelerating the rotor 25 consists of a coil spring 30 disposed within a recess 31 in the frame or body 11 provided with a cover plate 32. Disposed centrally of the spring 30 is a drive shaft 33 having its outer end journaled in the cover plate 32 and its inner end journaled in the wall 34 of the recess 31 of the frame or housing 11. The journal of the outer end of the shaft 33 may comprise a sleeve 35 surrounding the shaft, the split end of the shaft being expanded to hold the sleeve 35 in place by means of a plug 35a. The protruding end 36 of the shaft 33 is utilized to axially displace the shaft 33 to couple the same to the rotor shaft 28 in a manner later to be described.

As seen in FIGURE 6, the wall of the recess 31 is provided with a slot 37 adapted to be engaged by the outer end 38 of the spring 30. The inner end 39 of the spring 30 engages in a slot 40 in the drive shaft 33.

Secured to the end of the drive shaft 33 is a driving arm 41 adapted to engage in a notch 42 at the end of a ramp flange 43 of a drive plate 44. The drive plate 44 is secured to the hub 27 of the left-hand rotor part 26 by means of fasteners such as screws or the like 45.

With the construction just described, it will be apparent that the drive shaft 33 of the drive mechanism may be releasably coupled to the rotor shaft 28 to drive the same until it reaches the point of proper acceleration.

It is important that the rotor shaft 28 be properly oriented and the gyroscope caged during the acceleration of the rotor, and for this purpose, the end of the shaft 28 is provided with a reduced end portion 50 adapted to slidably engage in a socket 51 in the drive shaft 33 when the drive shaft is coupled to the rotor shaft, see particularly FIGURE 5.

The driving arm 41 is engaged in the notch 42 of the drive plate 44 by axially moving the drive shaft 33 from the left to the right, as viewed in FIGURE 5. This is accomplished by pressing on the exposed end 36 of the drive shaft 33. This axial movement of the drive shaft 33 displaces the center of the spring 30 laterally to an out-of-plane position, as shown in FIGURE 5. This lateral distortion of the center of the spring is not only resisted by the spring itself, but by a spring return device 53 surrounding the drive shaft 33 and engaging the wall 34 of the recess 31.

As shown, the spring return device 53 is in the form of a single leaf spring member which is tensioned when the spring 30 is displaced to an out-of-plane position, as described above. When the spring 30 has spent its force and ceases to exert a driving force on the rotor shaft 28, the rotor overruns the drive plate 44 causing the notched flange to move out of engagement with the driving arm 41 permitting the spring 30, under the influence of the spring member 53, to return to its in-plane position and thereupon uncages the rotor by moving the drive shaft 33 away from and out of its telescopic engagement with the reduced end 50 of the rotor shaft so that the spinning rotor is then freely supported on the gimbal system.

To hold the device in armed condition, there is provided a latch member 60 pivotally mounted on a shaft 61 extending between spaced lateral extensions 62 of the frame 11. The latch member 60 is provided with a laterally extending finger 63 adapted to engage any one of a plurality of stops 64 projecting from the adjacent face of the rotor part 26. The latch member 60 is normally biased to inoperative position by means of a spring member 65 coiled as at 66 about the shaft 61, and has a portion 67 engaging the frame 11 and arms 68 bearing against the latch member 60. The latch member 60 may be provided with a finger piece 69 to facilitate its movement into operative position and into engagement with the latch catch yet to be described.

In order to hold the latch member 60 in operative position in the path of the stops 64, there is provided a latch hook member 70 pivotally mounted on a shaft 71 extending between the lateral extensions 62 of the frame. The latch hook 70 has a hook portion 72 adapted to engage the upper edge of the latch member 69 to hold the same in its operative position shown in full lines in FIGURE 5. The latch hook 70 is released by rotating the same in a counterclockwise direction (as viewed in FIGURE 5), and this may be accomplished electrically by providing a pair of solenoids or other electrical devices 73 having movable cores 74 adapted to engage tongues or projections 75 formed on the lower edge of the latch hook 70.

To arm the device, the drive shaft 33 is coupled to the rotor shaft 28 through the drive plate 44 by displacing the spring laterally and engaging the arm 41 with the notch 42 of the drive plate 44. At this time, the rotor is caged by the engagement of the reduced end 50 of the rotor shaft 28 with the socket 51 in the drive shaft 33. Then, by use of a suitable tool or instrument (not shown) engaging holes 80 in the right-hand rotor part 26, the spring 30 may be wound and the device is held in its armed condition by moving the latch member 60 into the full line position shown in FIGURE 5 and holding the latch in this position by moving the latch member 70 into latching position, also as shown in full lines in FIGURE 5. In this position of the latch member, the finger 63 lies in the path of one of the stops 64 to prevent the spring from rotating the rotor.

The device is triggered by energizing the electrical devices 73 which move the latch catch 70 in a counterclockwise direction, thereby releasing the latch member 60 whereupon the spring 65 moves the latch member from its full line position shown in FIGURE 5 to its dotted line position in this figure. Thereupon, the spring accelerates the rotor and when the spring has spent its force, the spring return member 53 causes the spring 30 to return to its in-plane position, which moves the drive shaft 33 to the left (as viewed in FIGURE 5) to uncouple the drive shaft 33 from the rotor shaft 28. This movement of the drive shaft 33 also disengages the socket 51 from the reduced end portion 50 and uncages the rotor. The rotor is then freely supported on the gimbal system and the gyroscope is in operation.

While a commercially practical embodiment of the invention has been described and illustrated herein somewhat in detail, it will be understood that various changes may be made as may come within the purview of the accompanying claims.

What is claimed is:

1. A gyroscope assembly comprising a gimbal system, a rotor supported on said gimbal system and including a shaft located in the axis of rotation thereof, a drive mechanism comprising a coil spring having a centrally located drive shaft fixed thereto in axial alignment with said rotor shaft, said drive shaft being axially movable to displace the center of said spring, and complementary coupling means on the adjacent ends of said rotor and drive shafts adapted to be coupled upon displacing the center of said spring laterally to an out-of-plane position providing a caging and driving coupling therebetween, said coupling means being so constructed that when the spring ceases to exert its driving force said coupling means may uncouple and said spring return to in-plane position.

2. A device as described in claim 1 in which said coupling means comprises a drive member carried by one of said shafts and provided with engaging means and a member on the other shaft adapted to engage said engaging means to releasably couple said shafts together.

3. A device as described in claim 1 in which said coupling means comprises an arm on one of said shafts and a drive plate carried by the other shaft, said drive plate being formed with a peripheral ramp flange provided with a notch in the end thereof adapted to be engaged by said arm to couple said shafts together during rotation of the drive shaft in one direction.

4. A device as described in claim 1 in which one of said shafts has a reduced end portion adapted to slidably engage a socket in the adjacent end of the other shaft in the coupled position of said shafts, to hold said rotor initially in a caged condition during acceleration of the rotor.

5. A gyroscope assembly comprising, a gimbal system, a rotor supported on said gimbal system and including a shaft located in the axis of rotation thereof, a drive mechanism comprising a coil spring having a centrally located drive shaft fixed thereto in axial alignment with said rotor shaft and axially movable to laterally displace the center of said spring, complementary coupling means on the adjacent ends of said rotor and drive shafts adapted to be coupled upon displacing the center of said spring laterally to an out-of-plane position, whereby when the spring ceases to exert its driving force it returns to in-plane position and uncouples said shafts and means for holding said device in armed condition comprising a stop on said rotor, a spring-biased latch member, adapted in its operative position to engage said stop, means for holding said latch member in operative position, and means for releasing said holding means to trigger said drive mechanism.

6. A gyroscope assembly comprising, a gimbal system, a rotor supported on said gimbal system and including a shaft located in the axis of rotation thereof, a drive mechanism comprising a coil spring having a centrally located drive shaft fixed thereto in axial alignment with said rotor shaft and axially movable to displace the center of the spring, complementary coupling means on the adjacent ends of said rotor and drive shafts adapted to be coupled upon displacing the center of said spring laterally to an out-of-plane position, whereby when the spring ceases to exert its driving force it returns to in-plane position and uncouples said shafts and means for holding said device in armed condition comprising a stop on said rotor, a latch member spring biased into inoperative position and adapted in its operative position to engage said stop, a latch hook engageable with said latch member to hold the latter in operative position, and means for actuating said latch hook to disengage said latch member to thereby trigger said drive mechanism.

7. A gyroscope assembly comprising, a gimbal system, a rotor supported on said gimbal system and including a shaft extending along the axis of rotation thereof, a drive mechanism comprising a coil spring having a centrally located drive shaft fixed thereto in axial alignment with said rotor shaft, said drive shaft being axially movable to laterally displace the center of said spring, complementary coupling means on the adjacent ends of said rotor and drive shafts, the center of the spring, when wound, being displaced laterally into an out-of-plane position to permit engagement of said coupling means, whereby when the force of the spring is spent it returns to its in-plane position to disengage said coupling means, and addition complementary means on the ends of said rotor and drive shafts engageable in the coupled position of said shafts to hold said rotor initially in a caged condition during acceleration of the rotor.

8. A device as described in claim 7 in which the last named complementary means comprises a reduced end portion on one of said shafts and a socket in the adjacent end of the other shaft with which said reduced end portion is slidably engaged.

9. A device as described in claim 7 in which a spring device engages the center of the driving spring to return it to its in-plane position.

References Cited by the Examiner
UNITED STATES PATENTS

| | | | |
|---|---|---|---|
| 2,911,832 | 11/1959 | Thierman | 74—5.12 X |
| 2,918,869 | 12/1959 | Cumming et al. | 74—5.7 X |
| 2,982,140 | 5/1961 | Bennett | 74—5.12 |

BROUGHTON G. DURHAM, *Primary Examiner.*